US007690146B2

United States Patent
Jong et al.

(10) Patent No.: US 7,690,146 B2
(45) Date of Patent: Apr. 6, 2010

(54) DECORATABLE DEER REPELLENT CHEATING DUMMIES

(76) Inventors: Chiou-Muh Jong, 11058 Dorsch Farm Rd., Ellicott City, MD (US) 21042; Benjamin Chou, 12803 Maidens Bower Dr., Potomac, MD (US) 20854

( * ) Notice: Subject to any disclaimer, the term of this patent is extended or adjusted under 35 U.S.C. 154(b) by 275 days.

(21) Appl. No.: 11/758,301

(22) Filed: Jun. 5, 2007

(65) Prior Publication Data
US 2008/0041321 A1  Feb. 21, 2008

Related U.S. Application Data

(60) Provisional application No. 60/767,548, filed on Jul. 3, 2006.

(51) Int. Cl.
*A01M 29/04* (2006.01)
*A01M 29/02* (2006.01)
*A01M 29/00* (2006.01)

(52) U.S. Cl. ............. 43/1; 43/2; 43/124; 119/719; 119/666; 116/22 A

(58) Field of Classification Search ........... 43/1, 43/2, 124; 116/22 A; 52/101; 119/665, 119/666, 719, 721
See application file for complete search history.

(56) References Cited

U.S. PATENT DOCUMENTS

| | | | | |
|---|---|---|---|---|
| 726,131 A | * | 4/1903 | Barnes | 43/1 |
| 2,241,092 A | * | 5/1941 | Jurgilanis | 239/261 |
| 2,788,762 A | * | 4/1957 | Wright | 116/22 A |
| 3,113,304 A | * | 12/1963 | Lindley | 116/22 A |
| 3,412,394 A | * | 11/1968 | Lewis et al. | 116/22 A |
| 4,185,581 A | * | 1/1980 | Tilton | 116/22 A |
| 4,573,427 A | * | 3/1986 | Konzak | 116/22 A |
| 4,598,660 A | * | 7/1986 | Konzak | 116/22 A |
| 4,656,770 A | * | 4/1987 | Nuttle | 43/2 |
| 4,890,571 A | * | 1/1990 | Gaskill | 43/2 |
| 4,965,552 A | * | 10/1990 | Price et al. | 367/139 |
| 4,996,521 A | * | 2/1991 | Hollow | 116/22 A |
| 5,009,192 A | * | 4/1991 | Burman | 119/720 |
| 5,148,621 A | * | 9/1992 | Rosen | 43/1 |
| 5,278,537 A | * | 1/1994 | Carlo et al. | 116/22 A |
| 5,418,518 A | * | 5/1995 | Schenken et al. | 116/22 A |
| 5,425,192 A | * | 6/1995 | Negre | 43/1 |
| 5,452,536 A | * | 9/1995 | Chatten | 43/1 |
| 5,458,093 A | * | 10/1995 | MacMillan | 119/720 |
| 5,501,179 A | * | 3/1996 | Cory | 119/712 |

(Continued)

FOREIGN PATENT DOCUMENTS

DE    19858204 A1 *  6/2000

(Continued)

*Primary Examiner*—Darren W Ark
(74) *Attorney, Agent, or Firm*—Rosenberg, Klein & Lee

(57) ABSTRACT

A cheating dummy for repelling deer and similar animals from forbidden site is invented. In addition to cheating ability, the dummy also equipped with sensor for detecting approaching animals and capable of triggering actions such as spreading water toward approaching animals, generating ultrasound to scare them and even making a gunshot sound to repel them. By combining cheating and scaring functions, the repelling effect is expected to be much better than those devices using only sprinkling water or ultra-sound repelling alone. The cheating dummy is user decoratable by dressing with customized outfits for decoration or increasing cheating ability.

5 Claims, 1 Drawing Sheet

U.S. PATENT DOCUMENTS

Figure 1:
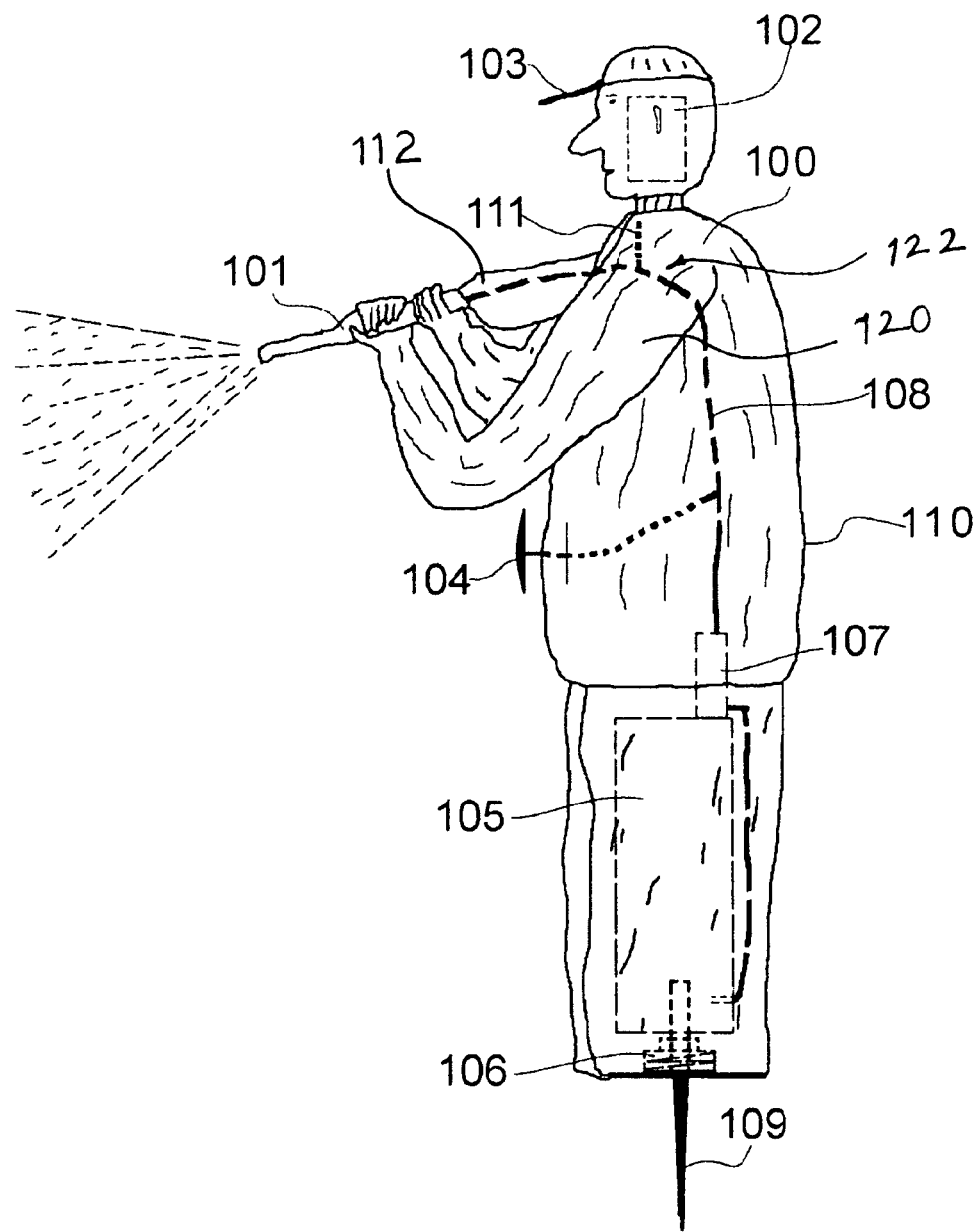

| | | | | |
|---|---|---|---|---|
| 5,602,523 A * | 2/1997 | Turchioe et al. | | 116/22 A |
| 5,603,287 A * | 2/1997 | Houck | | 119/719 |
| 5,682,701 A * | 11/1997 | Gammon | | 43/2 |
| 5,878,956 A * | 3/1999 | Djukastein et al. | | 239/69 |
| 5,892,446 A * | 4/1999 | Reich | | 340/573.1 |
| 5,901,491 A * | 5/1999 | Caldwell | | 43/1 |
| 5,966,075 A * | 10/1999 | Blanks | | 119/719 |
| 5,977,866 A * | 11/1999 | Joseph et al. | | 116/22 A |
| 5,986,551 A * | 11/1999 | Pueyo et al. | | 340/573.1 |
| 5,988,113 A * | 11/1999 | Zhioua et al. | | 119/666 |
| 6,079,139 A * | 6/2000 | Berry | | 43/1 |
| 6,351,908 B1 * | 3/2002 | Thomas | | 43/1 |
| 6,373,385 B1 * | 4/2002 | Wheeler | | 116/22 A |
| 6,396,402 B1 * | 5/2002 | Berger et al. | | 119/713 |
| 6,407,670 B1 * | 6/2002 | Dysarsz et al. | | 340/573.2 |
| D463,523 S * | 9/2002 | McCombs | | D22/125 |
| 6,615,770 B2 * | 9/2003 | Patterson et al. | | 119/719 |
| 6,625,918 B2 * | 9/2003 | Bhullar | | 43/1 |
| 6,658,782 B2 * | 12/2003 | Brint | | 43/2 |
| 6,700,486 B1 * | 3/2004 | Banki | | 340/541 |
| 6,718,681 B2 * | 4/2004 | Bhullar | | 43/1 |
| 6,807,765 B2 * | 10/2004 | Watermann | | 43/2 |
| 7,028,633 B2 * | 4/2006 | Pinton et al. | | 116/22 A |
| 7,246,569 B2 * | 7/2007 | Grandy et al. | | 116/22 A |
| 7,255,060 B2 * | 8/2007 | Grandy | | 116/22 A |
| 7,278,375 B2 * | 10/2007 | Ross et al. | | 116/22 A |
| 7,337,750 B2 * | 3/2008 | Drake | | 116/22 A |
| 7,409,924 B2 * | 8/2008 | Kates | | 119/719 |
| 7,434,541 B2 * | 10/2008 | Kates | | 119/719 |
| 7,462,364 B2 * | 12/2008 | Bell | | 424/405 |
| 2003/0116100 A1 * | 6/2003 | Cullen | | 119/719 |
| 2006/0196445 A1 * | 9/2006 | Kates | | 119/719 |
| 2008/0017132 A1 * | 1/2008 | Merrifield et al. | | 119/719 |
| 2008/0210153 A1 * | 9/2008 | Alvarado | | 116/22 A |
| 2009/0020073 A1 * | 1/2009 | Hansen | | 43/1 |
| 2009/0120374 A1 * | 5/2009 | Hansen | | 119/719 |
| 2009/0260272 A1 * | 10/2009 | Donoho | | 43/1 |

FOREIGN PATENT DOCUMENTS

| | | | |
|---|---|---|---|
| GB | 2049385 A | * | 12/1980 |
| JP | 06233643 A | * | 8/1994 |
| JP | 07255351 A | * | 10/1995 |
| JP | 08214760 A | * | 8/1996 |
| JP | 2000350549 A | * | 12/2000 |
| JP | 2001211808 A | * | 8/2001 |
| JP | 2004065090 A | * | 3/2004 |
| JP | 2004073111 A | * | 3/2004 |
| JP | 2007037457 A | * | 2/2007 |

* cited by examiner

DECORATABLE DEER REPELLENT CHEATING DUMMIES

1. FIELD OF THE INVENTION

The present invention relates to detecting and repelling of deer from a garden or a home site. More specifically, it relates to using a human or fierce animal like dummies equipped with sensing elements for detecting the motion of deer or other animals to be repelled and triggering functions such as sprinkling water and sound resembling gunshot for scaring them away.

2. BACKGROUND OF THE INVENTION

As more and more people choose to live in suburban area with bigger home sites, they get more threat of property damage from the migrating deer as well. It is commonly known that there is increasing damage and loss caused by the rising deer population, which, in search of food are migrating to populated suburban areas.

There is a need to deter animals, including domestic animals such as cats and dogs, together with many other animals from certain areas, but not hurt the animals in any way. Furthermore, there is a requirement to have a deterrent device for animals which does not harm the environment.

A very old way to deter animals from eating crops is to use humanoid dummies in the farm. Since these dummies do not move, do not act and do not make noise toward approaching animals to be repelled, the effectiveness is very limited. Newer ways to achieve deterring goal include spraying of specific chemicals in designated area, which is considered as a not environmental friendly way to do and the effect is deteriorating with increasing raining days. Using ultrasound, especially in specific generation pattern, is also a popular way to repel animals such as deer. U.S. Pat. Nos. 5,278,537, 5,418,518 and 5,602,523 are examples for such repelling system. The effectiveness, however, is generally not as good as desired.

A lot of attempts based on other schemes have also been proposed to repel animals to avoid damages. U.S. Pat. Nos. 5,009,192, 5,458,093 and 6,373,385 all provide devices which activate sprinklers when animals enter a certain area and provide several pulses of water until the animals move out of the area. Pulse type sprinklers have a definite tick noise as they move through an arc and these may be set up to be activated when an animal is detected in a specific area. They typically use solenoid valves to control the spray of water through sprinklers.

These devices, although proved to be effective, have a big drawback that a connecting pipe is needed to supply pressurized tap water for activating the sprinklers. Such piping line lying on the lawn, unless buried under ground, is not only a nuisance for the landscape, but also a trap for human and machine to move on the lawn surface and in general is considered as a headache for homeowner in the lawn mowing season.

3. SUMMARY OF THE INVENTION

The present invention combines the century old trick of utilizing a dummy that resembling humanoid or fierce animals such as tiger with new methods available in markets as a new inventive way and embodiment to achieve the goal of repelling deer and other. In a preferred embodiment, the dummy is equipped with a sensing element to sense the approaching motion and capable of triggering sound of gunshot and/or sprinkling water toward approaching animals. The standing dummy also has at least a movable part such as gun-hand combination which resembling human aiming action and/or sprinkler rotating action for more scaring effect. The cavity inside the dummy is used as a water storage tank, from which the water is pumped out instantly to feed a water gun or a sprinkler for spreading toward approaching animals. In this way, water can be added periodically and thus eliminating the need for a connecting water pipe line. In addition, the dummy is decoratable by being able to be customized with different styles of cloth and outfits to make the cheating even more real.

4. BRIEF DESCRIPTION OF DRAWINGS

FIG. 1 shows a humanoid dummy with major parts resembling human body, head and limbs. It also shows equipped with rifle-like parts for visually scaring and acting to drive animals away.

5. DETAILED DESCRIPTION OF THE INVENTION

Referring to FIG. 1, a dummy 100 is shown with a ground stake 109 for supporting the dummy standing on the ground. Typically, the dummy will have a shell made of light material such as plastics, wood or even aluminum in thin thickness, in which the enclosed empty cavity inside the dummy body can be arranged for installing various parts and components.

A preferred embodiment of present invention is to use the cavity to house a power source such as a battery and associated control unit 102, a water storage tank 105 and water pressurization unit such as a water pump 107 etc . . . Upon signaling the existence of approaching deer inside a neighborhood determined by selection of sensitivity of a motion detection sensor 104, said motion detection sensor will trigger the water pump for pressurizing water, which can be sprayed toward approaching animals through a water gun or sprinkler device 101 to scare away the animals. Meanwhile, the gun-like device 101 will create a sudden noise, or a gunshot like sound for more scaring power. This embodiment has an obvious advantage of no supply piping is needed during operation period. Water is added only when storage is low and usually can be done at the same time when the gardener watering the garden. Each time when the pump is activated due to existence of approaching animals, a short time, say 3 seconds, will be enough for a sprinkler to spread adequate water to scare away the animals. A 3 second running of sprinkler under 2 bar water pressure will roughly displace about 350 cc (directly measured from amount of water output from a sprinkler driven by tap water supply) water. Consequently a storage tank of 12" diameter and 12" height which has a volume of 22,229 cc can store enough water for 63 times and it will be good for more than one week without the need to add water if the sprinkler sprays an average of 9 times a day, which is a high end estimate of possible animal invasions. Anyway, a moderate size of storage tank is all you need to design such system. The volume of cavity inside the dummy will easily satisfy the need.

For the sake of neat assembly, a conduit 108 which bundles a water piping and electrical wire can be installed inside the dummy cavity. The water piping delivers pressurized water to water gun from storage tank 105 while the electrical wires including the section 111 deliver required power from battery 102 to pump 107 and sensor 104, in addition to control wiring from sensor 104 to pump 107 and water gun 101. Such suitable means known in the art as electrically powered devices for generating sound 112 may thereby be provided in the gun-like device 101, coupled via the control wiring.

Water inlet 106 is used to charge the water tank with clear tap water. In case when the pressurized tap water is immediately available, water inlet 106 can also be used as a permanent inlet and storage tank 105 as a pressurized water tank without using water pump 107. However, a solenoid valve will be needed to replace the water pump 107 and wired to sensor 104 for controlling the open-close action according to sensor signal.

A hat 103 equipped with a solar panel on its flat portion can be used to provide required power charging into battery unit 102. As mentioned above, the water pump works only briefly when sensor detects the intrusion of animals, it requires very limited amount of electricity. Sensor, although stands by for the whole working period, requires very small amount of energy to keep alert too, the whole system is perfectly suitable to be operated independently in the outdoor environment without the need to use indoor AC power. In a system described previously as a preferred embodiment, a submerged small pump which delivers water in the pressure range of 1.5-2 bar with a flow rate about 150 cc/sec roughly needs about 60 watt power to drive. Because it only runs less then 30 (27 for 9 times every day from previous estimation) seconds every day, a maximum of 1800 joules electrical energy is needed to compensate for energy consumed in the battery. And since the pump is the heaviest energy consumer in such system, an amount of 3000 joules daily energy consumption will be high end estimation of system energy requirement. Such energy will be easily supplied by a 16V, 100 mA solar collector under sunshine for one hour which can roughly provide 5,700 joules in peak condition for recharging into battery. Consequently, a solar collector in the size of 150 mm×120 mm which is capable of delivering 16V and 100 mA will be sufficient for such a system to be operated solely based on solar power. Theoretically, a power source slightly higher than 12V, say, 13V will be enough to recharge a 12V battery. However, it is recommended that as high as 16, even 18V from a solar collector power source for charging 12V system because the difficulty in maintaining solar collector in peak condition in an outdoor environment due to aging of the collector, dust on it and uncertainty of sunshine all contribute to the fading ability to charge a battery (such that it is still chargeable after significantly reducing output voltage to, say, 14V after years of use).

In a North America location, typically about 4.5 KWH solar energy per day per $m^2$ is available in yearly average, which means that, for a 0.015 $m^2$ solar collector, we can expect to collect an average of 31,600 joules/day for charging into the battery under the assumption of 13% solar collector efficiency. Therefore, even the charging efficiency is as low as 50%, more than 15,000 joules is still much more than exceeding the need of 3,000 joules/day. All these data conclude that a small area as 0.015 square meters, which can be any flat surface on the rim of a hat for a cheating dummy will suffice the solar energy need to run a sensor and pump equipped repelling system embodied in the present invention.

The dummy itself can be decorated in any style by the user. Costume 110, for example, can be of any color and any scaring effect such as shining flare pieces, even small solar panels can be put on the outfit. The arms of the dummy can also be used to hang some other items which are considered as having scaring effect to the animals. The decoration on the dummy, in fact, creates an infinite imaginable ways for increasing scaring effect against approaching animals. The decoration also can be customized to personal preference to make the animal deterring device possibly an additional garden favorite.

A simple mechanism such as rotating cam/follower which provides oscillating movement for the dummy's arms 120 can also be used to enhance the dummy's scaring power. Such mechanism provides in certain embodiments a movable joint 122, whereupon a part of the dummy is capable of restorable movement upon triggering of a corresponding action. A specific pattern of ultrasound can also be used for first stage deterring, which means that we can spare the activations of other deterring mechanisms if it successfully repels approaching animals away in the first stage.

With respect to the above description then, it is to be realized that the optimum relationships for the parts of the invention, which including variations in size, materials, shape, form, function and manner of operation, assembly and use, are deemed readily apparent and obvious to one skilled in the art, and all equivalent relationships to those illustrated in the drawing and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus for repelling animals comprising:
    a dummy for deterring approaching animals, said dummy being formed with a figurine structure having a head portion, said dummy further comprising a movable part with at least a movable joint connected thereto which allows said movable part to move relative to said dummy;
    a motion detector installed in said dummy for detecting said approaching animals;
    means for executing a plurality of deterring actions to scare away said approaching animals, said plurality of actions including sound generation and liquid release from said dummy, said means for executing a plurality of deterring actions further comprising:
        a water storage tank and a water pump for providing pressurized water, wherein the water storage tank and water pump are located inside said dummy, and
        means for generating sound for creating sound in the sound generating action, and
        a common portion of said dummy, said common portion being coupled to said movable part of said dummy;
    a trigger mechanism for triggering said means for executing the plurality of deterring actions responsive to said motion detector to execute said plurality of deterring actions;
    a power source for providing required electrical energy, said power source including a solar panel recharging portion disposed on said head portion; and
    a device for supporting said dummy standing on the ground;
    wherein said movable part of said dummy is capable of having a restorable movement upon triggering said actions, said sound generation action and said liquid release action originate substantially at said common portion, wherein liquid comprising water is sprayed from said common portion during execution of the liquid release action from said dummy, whereby the apparatus is portably configured for standalone operation unattached to an external device.

2. The apparatus according to claim 1, wherein said figurine structure of said dummy is configured in the form of a human being.

3. The apparatus according to claim 1, wherein said common portion of said dummy comprises a gun-shaped device and said means for generating sound is coupled to said power source for generating gunshot sound when executing the sound generation action.

4. The apparatus according to claim 1, wherein said common portion of said dummy includes a gun-like device, said sound generation action includes generation of a simulated gunshot sound.

5. The apparatus according to claim 1, wherein said power source includes a battery unit coupled to said solar panel recharging portion.

* * * * *